Figure 1:
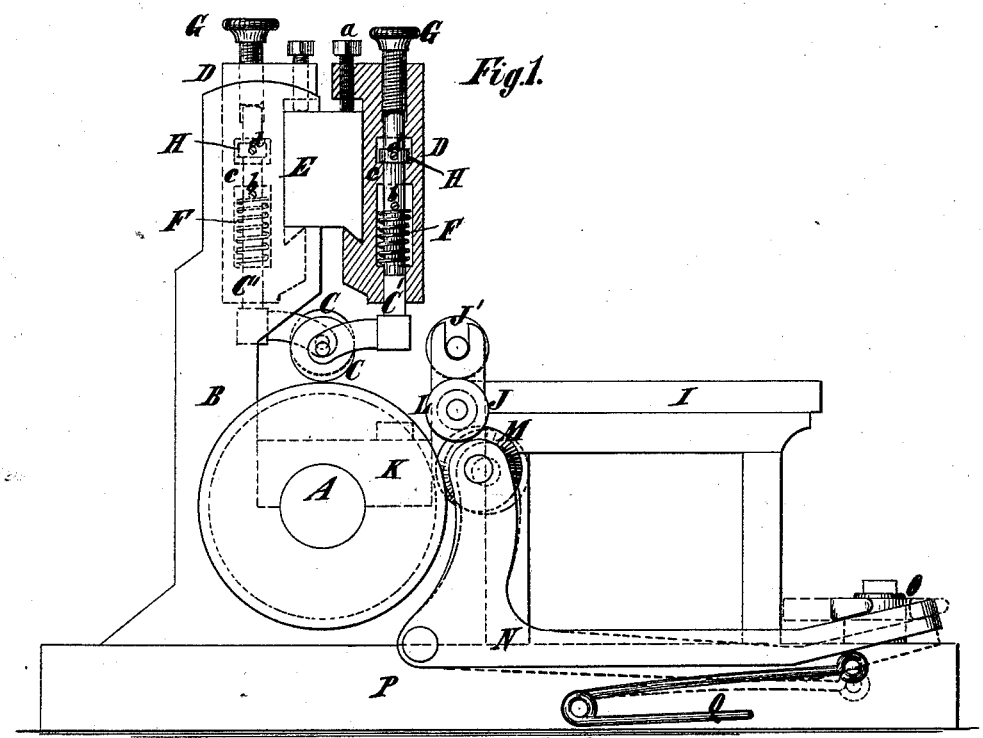

C. BROMBACHER.
Machine for Cutting and Scoring Card-Board.

No. 223,475. Patented Jan. 13, 1880.

Witnesses
John Becker
Thomas E. Birch.

Inventor
Charles Brombacher
by his Attorneys
Brown & Brown

UNITED STATES PATENT OFFICE.

CHARLES BROMBACHER, OF TARRYTOWN, NEW YORK.

MACHINE FOR CUTTING AND SCORING CARD-BOARD.

SPECIFICATION forming part of Letters Patent No. 223,475, dated January 13, 1880.

Application filed October 20, 1879.

*To all whom it may concern:*

Be it known that I, CHARLES BROMBACHER, of Tarrytown, in the county of Westchester and State of New York, have invented certain new and useful Improvements in Machines for Cutting and Scoring Card-Board, Binders' Board, Paper, and like Materials, of which the following is a specification.

My improvements are especially applicable to machines employed for cutting and scoring—that is, cutting partly through—materials for making paper boxes, for book-binding, and for similar purposes.

Heretofore the feed-rollers whereby the material has been presented to the cutters have been operating in unison with the cylinder supporting the material when subjected to the cutters, and on this account have unavoidably drawn in the material at whatever angle it has been presented to them. Narrow strips of paper cannot be reliably guided to the feed-roller by means of a side guide, and as the feed-rollers have been in constant motion they would not serve as a front guide. The importance of properly guiding the material to the feed-rollers is great, for any misguiding necessarily entails waste of time and material in retrimming, or precludes the proper fitting together of the material to form the articles for which they are designed.

The object of one of my improvements is to provide for stopping the feed-rollers, to enable them to serve as a front guide, without occasioning the stoppage of the whole machine.

To this end one of my improvements therefore consists in the combination, with a rotary shaft and the feed-rollers or a feed-roller in machines of the class I have referred to, of means for effecting the transmission of motion from the said rotary shaft to the feed rollers or roller, capable of adjustment to effect the operation or release of the feed rollers or roller at will, and capable of being actuated in any convenient manner, whereby the feed roller or rollers may be made to subserve the additional function of a stationary guide without stopping the machine.

There is a further objection in the machines referred to, as heretofore used, in regard to the difficulty of adjusting the cutters. To adjust their cutters, devices acting in conjunction above and below stationary devices to secure the cutters have needed to be manipulated, and the nice adjustment of the cutters which is necessary has been so difficult to effect as to require the services of skilled operators and consume much time. Moreover, the cutting of the cylinder supporting the paper, owing to the difficulty of accurately adjusting the cutters, has been, generally speaking, unavoidably entailed.

The object of another of my improvements is to provide a simple means for adjusting these cutters.

To this end another of my improvements consists in the combination, with a cutter and cutter-stock in a machine of the class above referred to, of a spring acting between the cutter-stock and cutter or cutter-shank to raise the cutter, an adjustable device, such as a screw carried by the cutter-stock and acting on the cutter or cutter-shank to force it toward the cylinder or support for the material to be cut, and a stop for limiting the adjustment of the cutter toward the said cylinder or support. This stop preferably will be adjustable, and then it will be necessary only for a skilled operator to properly adjust the stop, and afterward the cutters may be adjusted by any operator, the stop serving as a gage for the adjustment.

Figure 2:
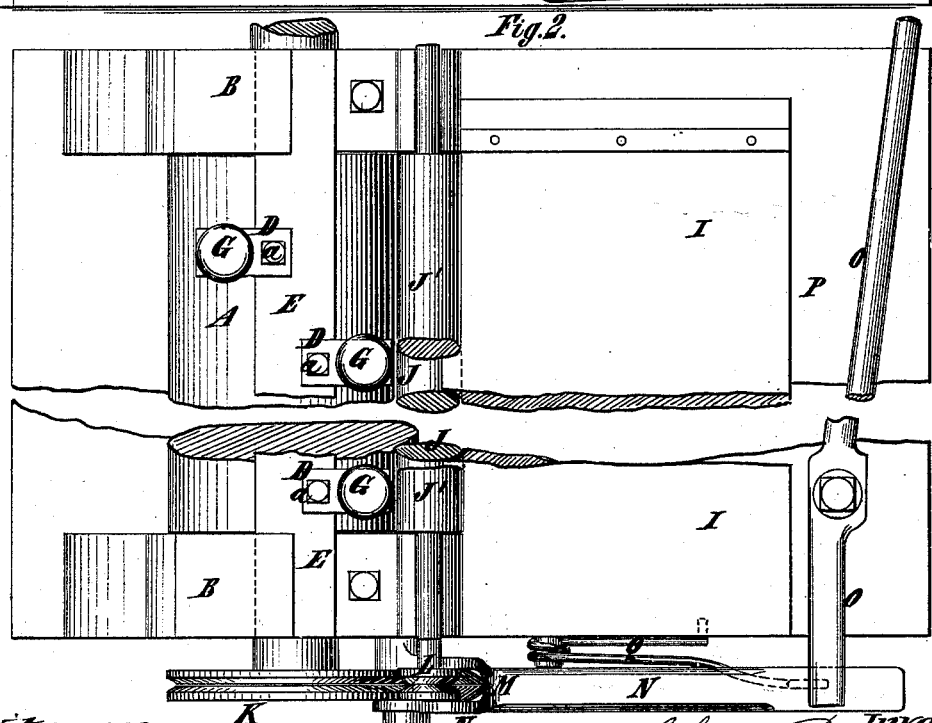

In the accompanying drawings, Figure 1 is a side view of a machine embodying my improvements, one of its cutter-stocks being shown in section; and Fig. 2 is a plan of the end portions thereof, the middle portion being omitted to save space.

Similar letters of reference designate corresponding parts in both figures.

A designates the support for the material to be cut, here shown as consisting of a rotary cylinder supported in standards or side frames, B, and having motion imparted to it through a crank, pulley, or other suitable device.

C designates a series of cutters of any suitable number, supported in cutter-stocks D, arranged so as to be susceptible of adjustment on a cross-bar, E, set-screws *a* being employed to secure them in position. Some of these cutters are arranged on one and others of them are arranged on the opposite side of the cross-bar E.

The shanks C' of the cutters C fit in the cutter-stocks D, so as to be adjustable lengthwise therein. Springs F, surrounding the shanks C' of the cutters C between the bottom portion of the cutter-stocks D, and cross-pins b, extending from the said shanks C', impel the cutters upward when not otherwise actuated, and screws G, impinging, in this example of my invention, upon the upper ends of the cutter-shanks C', provide for impelling the cutters downward.

H designates stops or gages, shown here as consisting of collars attached to the cutter-shanks C', and so arranged with relation to a rest or cross-piece, c, of the cutter-stocks that on coming in contact therewith during the downward movement of the cutters it will arrest them and prevent further adjustment in that direction. These collars H, as here shown, are attached to the cutter-shanks C' by set-screws d, and hence may be secured in different positions, so as only to admit of the downward adjustment of the cutter to the extent desirable.

To either raise or lower the cutters it is only necessary to manipulate the screws G, for when raised upward they will permit the springs F to raise the cutters, and when forced downward will depress the cutters as far as permitted by the stops or gages H. As these stops or gages limit the adjustment of the cutters, any unskilled person can adjust them without difficulty.

I designates a table, over which the material to be cut is fed, and J J' designate the feed-rollers by which such material is presented on the support or cylinder A to the cutters C. The roller J is supported in bearings in the side frames, B, with its upper portion about on a level with the table I, and the roller J' is supported in housings extending from the side frames, and so that it may gravitate relatively to the other.

K designates a friction-pulley carried by a rotary shaft, here shown as consisting of one of the journals of the support or cylinder A, and having a peripherical V-shaped groove.

L designates a friction-roller carried by the corresponding journal of the feed-roller J, and likewise having in its periphery a V-shaped groove.

M designates a friction-roller having a V-shaped periphery capable of engaging with the V-shaped grooves in the friction-rollers K and L. This roller M, as here shown, is loosely mounted on one arm of a bell-crank or elbow lever, N, pivoted to one of the side frames, B, and in such position that by swinging it properly the said friction-roller M may be made to engage with the rollers K and L, as shown in full outline in Fig. 1, or out of engagement with them, as shown in dotted outline in said figure. This lever may be operated by a treadle or otherwise.

I have shown a second lever, O, pivoted between its ends to the base-piece P of the machine, and extending at one end over the lower arm of the lever N, and at the other end to the opposite side of the machine, where it may be operated by the foot.

As here shown, the lever O serves to actuate the lever N so as to disengage the friction-roller M from the friction-rollers K and L, and a spring, Q, is employed to operate the lever N, so as to effect the engagement of the friction-roller M with the friction-rollers K and L; but it is obvious that the said lever O and spring Q may be arranged to operate reversely from what they now do. When the friction-roller M engages with the friction-rollers K and L it transmits motion from the former to the latter, and when disengaged therefrom allows the feed-rollers J J' to stop rotating, so that either or both may be used as a guide or gage whereby to adjust the material to be cut. I thus provide for stopping and starting the feed-rollers at pleasure without affecting the other parts of the machine.

I do not confine myself to friction-rollers, as, indeed, various other pulleys, wheels, or devices for controlling the driving of the feed-rollers from the cylinder or support A or other source of motion may be employed; but I prefer the friction-rollers for their faculty of starting and allowing of the stopping of the feed-rollers quickly and easily.

What I claim as my invention, and desire to secure by Letters Patent, is—

1. The combination, with a rotary shaft and the feed-rollers or a feed-roller of a machine for cutting card-board, binders' board, paper, and other like material, of means, substantially as described, for effecting the transmission of motion from the rotary shaft to the feed rollers or roller, and capable of adjustment to effect the operation of the feed rollers or roller at will, for the purpose specified, whereby the feed roller or rollers may be made to subserve the additional function of a stationary guide without stopping the machine.

2. The combination, in a machine for cutting card-board, binders' board, paper, and other like material, of a support for the material to be cut, feed-rollers or a feed-roller for the said material, and a wheel or pulley mounted on a lever and capable of being adjusted to transmit motion to or release the feed-roller from a rotary shaft which is the source of motion, for the purpose specified, whereby the feed roller or rollers may be made to subserve the additional function of a stationary guide without stopping the machine.

3. The combination of the cylinder or support A, friction-roller K, feed-roller J, friction-roller L, and the friction-roller M, mounted on the lever N, substantially as and for the purpose specified, whereby the roller J serves as a stationary guide without stopping the machine.

4. The combination, with a support for the material, a cutter or cutter-stock in a machine for cutting card-board, binders' board, paper, and like material, of a spring acting between the cutter or cutter-shank and cutter-stock to raise the cutter, an adjustable device carried by the cutter-stock and acting on the cutter or cutter-shank, and a stop or gage for limiting the adjustment of the cutter toward the support for the material, substantially as and for the purpose specified.

5. The combination, with a support for the material, a cutter and cutter-stock in a machine for cutting card-board, binders' board, paper, and like material, of a spring acting between the cutter or cutter-shank and cutter-stock to raise the cutter, an adjustable device carried by the cutter-stock and acting on the cutter or cutter-shank, and an adjustable stop or gage for limiting the adjustment of the cutter toward the support for the material, substantially as and for the purpose specified.

6. The combination of the cutter C, cutter-shank C', with their cross-pieces $b$, cutter-stock D, with its rest or cross-piece $c$, spring F, screw G, stop or gage H, and its set-screw $d$, substantially as and for the purpose specified.

CHAS. BROMBACHER.

Witnesses:
EDWIN H. BROWN,
T. J. KEANE.